United States Patent
Canova et al.

(10) Patent No.: US 12,534,421 B2
(45) Date of Patent: Jan. 27, 2026

(54) PELLETS CONTAINING AGRICULTURAL TREATMENT MATERIALS AND METHODS OF MAKING SAME

(71) Applicant: CARBO CERAMICS INC., Houston, TX (US)

(72) Inventors: Steve Canova, Macon, GA (US); Keith Hogan, Dublin, GA (US); Brett A. Wilson, Cypress, TX (US)

(73) Assignee: CARBO CERAMICS, INC., Houston, TX (US)

( * ) Notice: Subject to any disclaimer, the term of this patent is extended or adjusted under 35 U.S.C. 154(b) by 196 days.

(21) Appl. No.: 17/580,769

(22) Filed: Jan. 21, 2022

(65) Prior Publication Data

US 2022/0227682 A1    Jul. 21, 2022

Related U.S. Application Data

(60) Provisional application No. 63/140,235, filed on Jan. 21, 2021.

(51) Int. Cl.
| | | |
|---|---|---|
| C05G 5/40 | (2020.01) | |
| A01N 25/08 | (2006.01) | |
| A01N 25/12 | (2006.01) | |
| B01J 20/12 | (2006.01) | |
| B01J 20/26 | (2006.01) | |
| B01J 20/28 | (2006.01) | |
| C05D 9/02 | (2006.01) | |
| C05G 5/30 | (2020.01) | |
| C09K 17/04 | (2006.01) | |
| C09K 17/06 | (2006.01) | |
| C09K 17/12 | (2006.01) | |

(52) U.S. Cl.
CPC .............. *C05G 5/40* (2020.02); *A01N 25/08* (2013.01); *A01N 25/12* (2013.01); *B01J 20/12* (2013.01); *B01J 20/262* (2013.01); *B01J 20/2803* (2013.01); *B01J 20/28061* (2013.01); *C05D 9/02* (2013.01); *C05G 5/37* (2020.02); *C09K 17/04* (2013.01); *C09K 17/06* (2013.01); *C09K 17/12* (2013.01)

(58) Field of Classification Search
None
See application file for complete search history.

(56) References Cited

U.S. PATENT DOCUMENTS

| | | |
|---|---|---|
| 2,700,605 A | 1/1955 | Hornibrook |
| 2,779,670 A | 1/1957 | Burkett |
| 3,903,333 A | 9/1975 | Shirley, Jr. et al. |
| 4,223,070 A | 9/1980 | Hahn et al. |
| 4,316,813 A | 2/1982 | Voss |
| 4,521,239 A | 6/1985 | Simms et al. |
| 4,579,579 A | 4/1986 | Kerr |
| 4,936,897 A | 6/1990 | Pipko et al. |
| 5,395,449 A | 3/1995 | Quadir et al. |
| 5,399,186 A | 3/1995 | Derrah et al. |
| 5,454,851 A | 10/1995 | Zlotnikov et al. |
| 5,466,274 A | 11/1995 | Hudson et al. |
| 5,599,374 A | 2/1997 | Detrick |
| 5,851,261 A | 12/1998 | Markusch et al. |
| 6,080,221 A | 6/2000 | Moore |
| 6,165,550 A | 12/2000 | Markusch et al. |
| 6,210,625 B1 | 4/2001 | Matsushita et al. |
| 6,749,659 B1 | 6/2004 | Yu et al. |
| 6,936,573 B2 | 8/2005 | Wertz et al. |
| 7,410,522 B2 | 8/2008 | Green |
| 7,452,399 B2 | 11/2008 | Whittington |
| 8,617,284 B2 | 12/2013 | Kottegoda et al. |
| 8,668,759 B2 | 3/2014 | Antens et al. |
| 8,764,873 B2 | 7/2014 | Nevin |
| 8,940,074 B2 | 1/2015 | Kuo et al. |
| 9,296,661 B1 | 3/2016 | Ankeny |
| 9,328,030 B2 | 5/2016 | Burnham et al. |
| 9,416,064 B2 | 8/2016 | Yang et al. |
| 9,561,988 B2 | 2/2017 | Du et al. |
| 9,586,869 B1 | 3/2017 | Burnham et al. |
| 2002/0098983 A1 | 7/2002 | Pursell et al. |
| 2003/0220200 A1 | 11/2003 | Wertz et al. |
| 2004/0040708 A1 | 3/2004 | Stephenson et al. |
| 2004/0050126 A1 | 3/2004 | Green |
| 2005/0066697 A1 | 3/2005 | Cline et al. |
| 2005/0076687 A1 | 4/2005 | Whittington |
| 2006/0086289 A1* | 4/2006 | Mathur ................... C09C 1/42 |
| | | 106/484 |

(Continued)

FOREIGN PATENT DOCUMENTS

| | | |
|---|---|---|
| CN | 1988798 A | 6/2007 |
| CN | 101023243 A | 8/2007 |

(Continued)

OTHER PUBLICATIONS

Mumpton, "Using Zeolites in Agriculture" (Chapter VIII) Department of the Earth Sciences, State University College, 34 pages.

(Continued)

*Primary Examiner* — Ronak C Patel
(74) *Attorney, Agent, or Firm* — Whitaker Chalk Swindle & Schwartz PLLC; Enrique Sanchez, Jr.

(57) ABSTRACT

Pellets for use in agricultural applications are disclosed herein. The pellets can include a porous substrate having an internal interconnected porosity. An agricultural treatment material can be disposed into at least a portion of the internal interconnected porosity of the porous substrate.

7 Claims, No Drawings

(56) References Cited

U.S. PATENT DOCUMENTS

| | | |
|---|---|---|
| 2007/0186467 A1 | 8/2007 | Ramsey et al. |
| 2008/0034653 A1* | 2/2008 | Ramsey ................ A01G 24/18 47/64 |
| 2008/0064598 A1* | 3/2008 | De Rougemont ..... A01G 18/10 504/117 |
| 2009/0258786 A1* | 10/2009 | Pursell .................... C05G 5/40 504/358 |
| 2010/0222243 A1* | 9/2010 | Stephenson ........... E21B 43/267 507/224 |
| 2011/0033608 A1 | 2/2011 | Figuly et al. |
| 2011/0296887 A1 | 12/2011 | Kottegoda et al. |
| 2012/0272700 A1 | 11/2012 | Nevin |
| 2014/0366598 A1 | 12/2014 | Carmo |
| 2015/0101374 A1 | 4/2015 | Burnham et al. |
| 2015/0128671 A1 | 5/2015 | Ishizaka |
| 2016/0023959 A1* | 1/2016 | Bontchev ................ C05G 3/80 71/24 |
| 2018/0273837 A1* | 9/2018 | Savoy ...................... B01J 21/12 |
| 2019/0031574 A1 | 1/2019 | Liu et al. |
| 2020/0362233 A1* | 11/2020 | Lieng ...................... E21B 43/04 |

FOREIGN PATENT DOCUMENTS

| | | |
|---|---|---|
| DE | 29720370 U1 | 4/1998 |
| DE | 19750951 A1 | 6/1999 |
| EP | 0758633 A1 | 2/1997 |
| EP | 0897745 A4 | 2/1999 |
| WO | 2016113666 A1 | 7/2016 |
| WO | 2018160821 A1 | 9/2018 |

OTHER PUBLICATIONS

International Search Report and Written Opinion dated Apr. 1, 2022 for Application No. PCT/US2022/070271.

* cited by examiner

PELLETS CONTAINING AGRICULTURAL TREATMENT MATERIALS AND METHODS OF MAKING SAME

CROSS-REFERENCE TO RELATED APPLICATIONS

This application claims benefit of U.S. Provisional Patent Application No. 63/140,235, filed Jan. 21, 2021, which is herein incorporated by reference in its entirety.

BACKGROUND

Agricultural treatment chemicals, such as fertilizers, herbicides, and insecticides, can be applied to plants in solid and/or liquid form. Solid agricultural treatment chemicals are oftentimes in the form of pellets. These pellets are oftentimes coated to prevent saturation or premature elution of the nutrients into the area to be treated. For example, many attempts to provide a fertilizer product having a coating which provides for slow release of the fertilizer, rendering the fertilizer application effective over a long period of time, have been made. Many such processes have undesirable effects, such as sticky buildup in the coating equipment and release of chemicals from the slow release coatings into the surrounding environment.

There is a need, therefore, for agricultural treatment pellets that are environmentally friendly and that can exhibit slow-release characteristics without causing sticky build-up during manufacturing and/or delivery of the product to the field.

DETAILED DESCRIPTION

In the following description, numerous specific details are set forth. However, it is understood that embodiments of the disclosure may be practiced without these specific details. In other instances, well-known structures and techniques have not been shown or described in detail.

The term "internal interconnected porosity," as used herein, is defined as a percentage of the pore volume, or void volume space, over the total volume of a porous particulate.

The term "biodegradable," as used herein, means the ability of a chemical or coating to react to dissolve or breakdown into smaller components by microorganisms and/or natural environmental factors.

The term "mineral," as used herein, means any naturally occurring substance that is solid and inorganic.

The term "ceramic," as used herein, means any non-metallic, inorganic solid material prepared by the action of heat and then subsequent cooling.

The present disclosure is directed to pellets containing agricultural treatment materials or agricultural pellets or as used herein, simply "infused pellets." The infused pellets disclosed herein can include one or more agricultural treatment materials in any suitable arrangement. In one or more embodiments, the pellets can be porous particles, or porous substrates, and one or more agricultural treatment materials can be infused into or otherwise disposed in one or more pores of the porous substrates. The porous substrates can be or include one or more minerals, ceramic materials, or calcined, partially calcined, or uncalcined clays or minerals. In one or more embodiments, the porous substrates containing the agricultural treatment materials can also be coated with one or more layers for delayed and/or controlled release of the agricultural treatment materials into the surrounding environment. The layers can be or include one or more polymeric materials and/or one or more clays or minerals.

The infused pellet described herein can include a porous substrate and an agricultural treatment chemical infused or otherwise disposed into the porous substrate. For example, the agricultural treatment chemical can be infused or otherwise disposed into the internal interconnected porosity of the porous substrate.

The porous substrate can be or include any suitable porous material. In one or more embodiments, the porous substrate can be or include a ceramic material (e.g., ceramic proppant), a mineral, or a plant byproduct or combinations thereof. For example, the porous substrate can be or include phosphate ore, potash, attapulgite, finely divided minerals, fibers, ground almond shells, ground walnut shells, ground coconut shells, activated carbon, coal, petroleum coke, calcined coke, silica particulates, precipitated silicas, silica (quartz sand), cristobalite, mullite, alumina, silica-alumina, silica gel, mica, silicate, e.g., orthosilicates or metasilicates, calcium silicate, bauxite, kaolin, talc, zirconia, boron, fly ash, zeolites (including natural and synthetic zeolites), diatomaceous earth, fuller's earth, and organic synthetic high molecular weight water-insoluble adsorbents or combinations thereof.

The ceramic material can be or include partially calcined, calcined, or sintered clay, such as sintered kaolin, sintered bauxite, calcined kaolin, and calcined bauxite. For example, the porous substrate can be manufactured utilizing any steps prior to and including the partially calcining, calcining, and/or sintering step(s) of any suitable process for manufacturing ceramic particulates including, but not limited to continuous spray atomization, spray fluidization, drip casting, spray drying, or compression. Suitable porous substrates and methods for manufacture are disclosed in U.S. Pat. Nos. 4,068,718, 4,427,068, 4,440,866, 4,522,731, 4,658,899, 5,188,175, 7,036,591, 8,865,631, 8,883,693, 9,175,210, 9,670,400, 10,077,395, 10,077,398, and 10,118,863, the entire disclosures of which are incorporated herein by reference. The terms "partially calcined" and "calcined" are understood by those of ordinary skill in the art to mean clay that has been subjected to a heat treatment at times and temperatures above 550° C. to about 800° C., preferably from about 550° C. to about 600° C., to remove some (partially calcined) or substantially all (calcined) organic material and water of hydration from the clay (or gibbsite or diaspore). For example, partially calcining or calcining kaolin clay causes conversion of some (partially calcined) or substantially all (calcined) of the kaolinite in the clay to meta-kaolin, which is an amorphous pozzolan material.

The porous substrate can have any suitable apparent specific gravity (ASG). The term "apparent specific gravity," as used herein, is the weight per unit volume (grams per cubic centimeter) of the particle, including the internal porosity. The apparent specific gravity values given herein can be determined by the Archimedes method of liquid (water) displacement according to API RP60, a method which is well known to those of ordinary skill in the art. The porous substrate can have an apparent specific gravity of at least about 1.5 g/cc, at least about 1.7 g/cc, at least about 1.9 g/cc, at least about 2.1 g/cc, at least about 2.3 g/cc, at least about 2.5 g/cc, at least about 2.7 g/cc, at least about 3 g/cc, at least about 3.3 g/cc, or at least about 3.5 g/cc. In one or more embodiments, the porous substrate can have an apparent specific gravity of less than 4 g/cc, less than 3.5 g/cc, less than 3 g/cc, less than 2.75 g/cc, less than 2.5 g/cc, or less than 2.25 g/cc. For example, the porous substrate can have an apparent specific gravity of about 1.6 g/cc to about 3.8 g/cc, about 1.8 g/cc to about 3.2 g/cc, about 2.0 g/cc to about 2.7 g/cc, about 2.4 g/cc to about 2.9 g/cc, or about 3 g/cc to about 4 g/cc.

A plurality of porous substrate can have any suitable bulk density. As used herein, the term "bulk density" refers to the weight per unit volume (grams per cubic centimeter) of a plurality of objects including the void spaces between the particles in the volume considered. In one or more embodiments, the porous substrates have a bulk density of less than 3 g/cc, less than 2.5 g/cc, less than 2.2 g/cc, less than 2 g/cc, less than 1.8 g/cc, less than 1.6 g/cc, or less than 1.5 g/cc. The porous substrates can have a bulk density of about 0.05 g/cc, about 0.5 g/cc, about 1 g/cc, about 1.15 g/cc, about 1.25 g/cc, about 1.35 g/cc, or about 1.45 g/cc to about 1.5 g/cc, about 1.6 g/cc, about 1.75 g/cc, about 1.9 g/cc, or about 2.1 g/cc or more. For example, the porous substrates can have a bulk density of about 1.3 g/cc to about 1.8 g/cc, about 1.35 g/cc to about 1.65 g/cc, or about 1.5 g/cc to about 1.9 g/cc.

The porous substrate can have any suitable porosity. The porous substrate can have an internal interconnected porosity of about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the porous substrate is about 5% to about 75%, about 5% to about 15%, about 10% to about 30%, about 15% to about 35%, about 25% to about 45%, about 30% to about 55%, or about 35% to about 70%. According to several exemplary embodiments, the porous substrate can have any suitable average pore size. For example, the porous substrate can have an average pore size of about 2 nm, about 10 nm, about 15 nm, about 55 nm, about 110 nm, about 520 nm, or about 1,100 to about 2,200 nm, about 5,500 nm, about 11,000 nm, about 17,000 nm, or about 25,000 nm or more in its largest dimension. For example, the porous substrate can have an average pore size of about 3 nm to about 30,000 nm, about 30 nm to about 18,000 nm, about 200 nm to about 9,000, about 350 nm to about 4,500 nm, or about 850 nm to about 1,800 nm in its largest dimension.

The porous substrate can have any suitable size, such as for example, of about 2 mesh to about 400 mesh. For example, the porous substrate can have a size of about 10 mesh, 15 mesh, 20 mesh, 25 mesh, 30 mesh, or about 35 mesh to about 40 mesh, about 50 mesh, about 60 mesh, about 70 mesh, about 80 mesh, about 100 mesh, about 200 mesh, or about 300 mesh. In some embodiments, the porous substrate size (e.g., average diameter) can be about 5 mesh to about 150 mesh, about 10 mesh to about 80 mesh, about 20 mesh to about 40 mesh, about 30 mesh to about 70 mesh, or about 8 mesh to about 14 mesh. The porous substrate can have any suitable shape. In one or more embodiments, the porous substrate can be spherical, oblong, oblate, prolate, egg-shaped, cylindrical, or unsymmetrical. In one or more embodiments, the porous substrate is substantially round and spherical. The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

The porous substrate can have any suitable liquid holding capacity. For example, the porous substrate can have a liquid holding capacity of at least about 4 wt %, at least about 12 wt %, at least about 15 wt %, or at least about 20 wt %, as measured in accordance with ASTM E1521-14 using oil having a density of 0.77 g/cc. In one or more embodiments, the porous substrate can have a liquid holding capacity of about 8 wt %, about 10 wt %, about 14 wt %, about 16 wt %, or about 18 wt % to about 20 wt %, about 22 wt %, about 24 wt %, about 26 w %, or about 30 wt %, as measured in accordance with ASTM E1521-14 using oil having a density of 0.77 g/cc.

The porous substrate can have any suitable surface area. In one or more embodiments, the porous substrate can have a surface area as measured in accordance with the Brunauer-Emmett-Teller (BET) method of determining the specific surface area (BET surface area) of at least about 2 $m^2/g$, at least about 5 $m^2/g$, or at least about 10 $m^2/g$. In one or more embodiments, the porous substrate can have a BET surface area of less than 100 $m^2/g$, less than 50 $m^2/g$, or less than 30 $m^2/g$. For example, the porous substrate can have a BET surface area of about 2 $m^2/g$, about 4 $m^2/g$, about 6 $m^2/g$, or about 8 $m^2/g$ to about 12 $m^2/g$, about 15 $m^2/g$, about 20 $m^2/g$, or about 30 $m^2/g$.

The porous substrate can exhibit attrition resistance of at least about 80 wt %, at least about 85 wt %, at least about 90 wt %, at least about 95 wt %, at least about 97 wt %, or at least about 99 wt %, as measured in accordance with IFDC method S-116. In one or more embodiments, the porous substrate can exhibit an attrition resistance, as measured in accordance with IFDC method S-116, of about 90.1 wt % to about 99.9 wt %, about 95.8 wt % to about 99.9 wt %, or about 98.0 wt % to about 99.9 wt %.

The agricultural treatment materials disclosed herein can be infused, impregnated, injected or otherwise disposed into the interstitial or porous spaces of the porous substrate to provide the infused pellets described herein. Suitable agricultural treatment materials include, but are not limited to, fertilizers, soil conditioners, absorbent polymers (including superabsorbent polymers), nutrients, micronutrients or micronutrient fertilizers, pesticides, and the like. In one or more embodiments, the fertilizers can be or include urea, ammonium nitrate, sodium nitrate, phosphate rock, fluorapatite, hydroxyapatite, potash, potassium carbonate, potassium hydroxide, potassium chlorate, potassium chloride, potassium sulfate, potassium permanganate, potassium nitrate, or ammonium phosphate or any mixture or combination thereof. In one or more embodiments, the fertilizers can also be or include one or more organic fertilizers, such as animal wastes, manure, bloodmeal, bone meal, feather meal, hides, hoofs, horns, plant wastes, compost, treated sewage sludge (biosolids), peat, and the like. For example, the seeds can be pelletized urea, ground or pulverized phosphate rock, pelletized potash, or pelletized organic fertilizers. In one or more embodiments, the micronutrient fertilizers can be or include one or more of zinc, boron, manganese, iron, copper, molybdenum, (and oxides thereof), sulfates, phosphates, polyphosphates, chlorides, carbonates, and nitrates of same. In one or more embodiments, the soil conditioners can be or include one or more of biochar, sulfur, lime, superabsorbent polymers, and the like.

In one or more embodiments, the pesticides can include one or more of herbicides, insecticides, nematicides, molluscicides, piscicides, avicides, rodenticides, bactericides, insect repellents, antimicrobial compositions, fungicides, or combinations thereof. In one or more embodiments, the pesticides can be selected from carbamates, organophosphates, pyrethroids, neonicotinoids, strobilurin, fluvalinate, amitraz, coumaphos, chlorothalanil, chlorpyriphos, endosulfan, pendimethalin, fenpropathrin, esfenvalerate, azoxystrobin, methoxyfenozide, atrazine, bifenthrin, dicofol, aldicarb sulfoxide, trifluralin, boscalid, carbendazim, or combinations thereof.

The agricultural treatment materials disclosed herein can be infused, impregnated, injected or otherwise disposed into the interstitial or porous spaces of the porous substrate in any suitable manner to provide the infused pellets described herein. In one or more embodiments, the agricultural treatment materials can be infused into the porous substrates using the methods of infusion disclosed in U.S. Pat. Nos. 5,964,291, 7,598,209, and 9,994,764, the entire disclosures of which are incorporated herein by reference, and similar processes such as vacuum infusion, thermal infusion, capillary action, ribbon blending at room or elevated temperature, microwave blending or pug mill processing.

The infused pellets described herein may be coated with one or more layers polymeric materials for delayed and/or timed release of the agricultural treatment material from the infused pellet. Suitable polymeric materials can be or include polyurea, polyurethane, polylactic acid, polyvinyl alcohol, chitosan, chitin, and resins, such as phenolic resins and epoxy resins. The polymeric materials can form a coating surrounding the agricultural treatment material that is biodegradable or semi-permeable and substantially non-biodegradable, thereby controlling, delaying, or otherwise limiting the release of the agricultural treatment material to the outside environment.

In one or more embodiments, the coating can be a semi-permeable, substantially non-biodegradable coating. The semi-permeable, substantially non-biodegradable coating can be or include polyurea, polyurethane, phenolic resins and/or epoxy resins. For example, the resin material can include a phenolic resin, such as a phenol-formaldehyde resin. In one or more embodiments, the phenol-formaldehyde resin has a molar ratio of formaldehyde to phenol (F:P) from a low of about 0.6:1, about 0.9:1, or about 1.2:1 to a high of about 1.9:1, about 2.1:1, about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1. The phenol-formaldehyde resin can also have a molar ratio of formaldehyde to phenol of about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

In one or more embodiments, the phenol-formaldehyde resin has a molar ratio of less than 1:1, less than 0.9:1, less than 0.8:1, less than 0.7:1, less than 0.6:1, or less than 0.5:1. For example, the phenol-formaldehyde resin can be or include a phenolic novolac resin. Phenolic novolac resins are well known to those of ordinary skill in the art, for instance see U.S. Pat. No. 2,675,335 to Rankin, U.S. Pat. No. 4,179,429 to Hanauye, U.S. Pat. No. 5,218,038 to Johnson, and U.S. Pat. No. 8,399,597 to Pullichola, the entire disclosures of which are incorporated herein by reference. Suitable examples of commercially available novolac resins include novolac resins available from Plenco™, Durite® resins available from Momentive, and novolac resins available from S.I. Group.

In one or more embodiments, the phenol-formaldehyde resin has a weight average molecular weight from a low of about 200, about 300, or about 400 to a high of about 1,000, about 2,000, or about 6,000. For example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. The phenol-formaldehyde resin can also have a weight average molecular weight of about 175 to about 800, about 700 to about 3,330, about 1,100 to about 4,200, about 230 to about 550, about 425 to about 875, or about 2,750 to about 4,500.

In one or more embodiments, the phenol-formaldehyde resin has a number average molecular weight from a low of about 200, about 300, or about 400 to a high of about 1,000, about 2,000, or about 6,000. For example, the phenol-formaldehyde resin can have a number average molecular weight from about 250 to about 450, about 450 to about 550, about 550 to about 950, about 950 to about 1,500, about 1,500 to about 3,500, or about 3,500 to about 6,000. The phenol-formaldehyde resin can also have a number average molecular weight of about 175 to about 800, about 700 to about 3,000, about 1,100 to about 2,200, about 230 to about 550, about 425 to about 875, or about 2,000 to about 2,750.

In one or more embodiments, the phenol-formaldehyde resin has a z-average molecular weight from a low of about 200, about 300, or about 400 to a high of about 1,000, about 2,000, or about 9,000. For example, the phenol-formaldehyde resin can have a z-average molecular weight of about 250 to about 450, about 450 to about 550, about 550 to about 950, about 950 to about 1,500, about 1,500 to about 3,500, about 3,500 to about 6,500, or about 6,500 to about 9,000. The phenol-formaldehyde resin can also have a z-average molecular weight of about 175 to about 800, about 700 to about 3,330, about 1,100 to about 4,200, about 230 to about 550, about 425 to about 875, or about 4,750 to about 8,500.

In one or more embodiments, the phenol-formaldehyde resin has any suitable viscosity. The phenol-formaldehyde resin can be a solid or liquid at 25° C. For example, the viscosity of the phenol-formaldehyde resin can be from about 1 centipoise (cP), about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the phenol-formaldehyde resin can have a viscosity of about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity of about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the phenol-formaldehyde resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the phenol-formaldehyde resin can have a viscosity of about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C. The viscosity of the phenol-formaldehyde resin can be determined using a Brookfield viscometer.

In one or more embodiments, the phenol-formaldehyde resin can have pH from a low of about 1, about 2, about 3, about 4, about 5, about 6, about 7 to a high of about 8, about 9, about 10, about 11, about 12, or about 13. For example, the phenol-formaldehyde resin can have a pH of about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

In one or more embodiments, the coating is an epoxy resin. The epoxy resin can include bisphenol A, bisphenol F, aliphatic, or glycidylamine epoxy resins, and any combinations thereof. An example of a commercially available epoxy resin is BE188 Epoxy Resin, available from Chang Chun Plastics Co., Ltd.

In one or more embodiments, the epoxy resin can have any suitable viscosity. The epoxy resin can be a solid or liquid at 25° C. For example, the viscosity of the epoxy resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the epoxy resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the epoxy resin can have a viscosity of about 1 cP to about 45 cP, about 45 cP to about 125 cP, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the epoxy resin can also be from about 500 cP, about 1,000 cP, about 2,500 cP, about 5,000 cP, or about 7,000 cP to about 10,000 cP, about 12,500 cP, about 15,000 cP, about 17,000 cP, or about 20,000 cP at a temperature of about 25° C. In another example, the epoxy resin can have a viscosity of about 1,000 cP to about 12,000 cP, about 2,000 cP to about 11,000 cP, about 4,000 cP to about 10,500 cP, or about 7,500 cP to about 9,500 cP at a temperature of about 25° C. The viscosity of the epoxy resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the epoxy resin can have a viscosity of about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C.

In one or more embodiments, the epoxy resin can have pH from a low of about 1, about 2, about 3, about 4, about 5, about 6, about 7 to a high of about 8, about 9, about 10, about 11, about 12, or about 13. For example, the epoxy resin can have a pH of about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

Methods for coating particulates with resins and/or epoxy resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

In one or more embodiments, the coating can be a biodegradable coating. The biodegradable coating can include polyurethane-containing compounds, polyurea-containing compounds, polyolefins, aliphatic polyesters, polyethylene terephthalate (PET), polycaprolactone (PCL), polyesteramide (PEA), polybutylene succinate (PBS), polybutylene succinate adipate (PBSA), poly(vinyl alcohol) (PVOH), poly (vinyl acetate) (PVA), their copolymer or combinations thereof.

In one or more embodiments, the biodegradable coating can include any suitable biopolymers, such as polysaccharides, poly-peptides (protein), and lipids. Suitable polysaccharides can include, but are not limited to, cellulose (e.g. methylcellulose, hydroxypropyl methyl cellulose, hydroxyethyl cellulose and etc.) starch derivatives from cotton, wood, starch from potatoes, corn, wheat, rice, chitosan, gums, fibers (e.g., bast (or stem or soft sclerenchyma) fibers, leaf or hard fibers, seed, fruit, wood, cereal straw, and other grass fibers). Suitable proteins can include, but are not limited to casein, collagen, gelatin from animal and zeine, soya, gluten from plants.

In one or more embodiments, biopolymers suitable for use in or as the coating include, but are not limited to, poly(hydroxyalkanoate) (PHA), poly(caprolactone) (PCL), poly-3-hydroxybutyrate (PHB), poly(hydroxybutyrate-hydroxyvalerate) (PHB/HV), xanthan, curdian, pulluian and the combination thereof. In one more embodiments, the biopolymers can include, but are not limited to polylactic acid or polylactide (PLA), polyglycolic acid (PGA), their copolymer, or combination thereof. The biopolymers can also include aliphatic polyesters polyethylene terephthalate (PET), polycaprolactone (PCL), polyesteramide (PEA), polybutylene succinate (PBS), polybutylene succinate adipate (PBSA), poly(vinyl alcohol) (PVOH), poly (vinyl acetate) (PVA), their copolymer or combinations thereof.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A pellet for use in agricultural applications, comprising:
   a porous substrate comprising a partially calcined clay, wherein the porous substrate comprises an internal interconnected porosity of about 15% to about 35%, wherein the porous substrate has a surface area, as measured by a Brunauer-Emmett-Teller (BET) method, of about 2 m2/g to less than 100 m2/g, a pore size of about 2 nm to about 520 nm, and a liquid holding capacity of at least about 4 wt %, as measured in accordance with ASTM E1521-14 using an oil having a density of 0.77 g/cc;
   an agricultural treatment material disposed into at least a portion of the internal interconnected porosity, wherein:

the agricultural treatment material is selected from the group consisting of a fertilizer, a soil conditioner, and combinations thereof;

the fertilizer, if present, is selected from the group consisting of phosphate rock, fluorapatite, hydroxyapatite, potassium carbonate, potassium hydroxide, potassium chloride, potassium permanganate, and combinations thereof; and the soil conditioner, if present, is selected from the group consisting of biochar, lime, and combinations thereof; and a polymeric material coated onto the porous substrate comprising the agricultural treatment material, wherein the polymeric material is selected from the group consisting of polyurea, polyurethane, polylactic acid, polyvinyl alcohol, chitosan, chitin, phenolic resin, epoxy resin, and combinations thereof.

2. The pellet of claim 1, wherein the partially calcined clay is selected from the group consisting of kaolin, bauxite, dikite, ball clay, halloysite, montmorillonite, calcium carbonate, potash, pyrophylite, polysulphate, kieselguhr, endellite, saponite, rectorite, sepiolite, attapulgite, hydrotalcite, bentonite and combinations thereof.

3. The pellet of claim 2, wherein the partially calcined clay comprises attapulgite.

4. The pellet of claim 1, wherein the porous substrate has:
an attrition resistance of at least about 85 wt %, as measured in accordance with IFDC method S-116.

5. The pellet of claim 1, wherein the agricultural treatment material comprises the fertilizer selected from the group consisting of phosphate rock, fluorapatite, hydroxyapatite, potassium carbonate, potassium hydroxide, potassium chloride, potassium permanganate, and combinations thereof.

6. The pellet of claim 1, wherein the agricultural treatment material comprises the soil conditioner selected from the group consisting of biochar, lime, and combinations thereof.

7. The pellet of claim 1, wherein the polymeric material comprises polyurea.

* * * * *